MULTIPLE HEAD FOR MAGNETIC RECORDING AND REPRODUCTION

Filed April 2, 1951 2 Sheets-Sheet 1

INVENTOR.
Walter T. Selsted
BY
Lippincott & Smith
ATTORNEYS

MULTIPLE HEAD FOR MAGNETIC RECORDING AND REPRODUCTION
Filed April 2, 1951 2 Sheets-Sheet 2
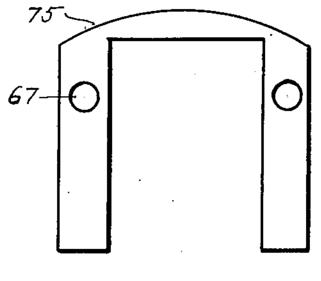
Fig. 7.
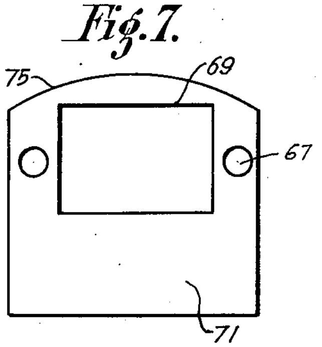
Fig. 6.
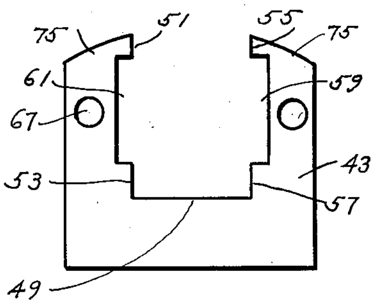
Fig. 5.
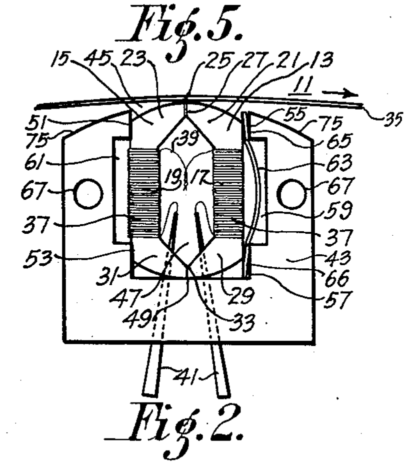
Fig. 2.
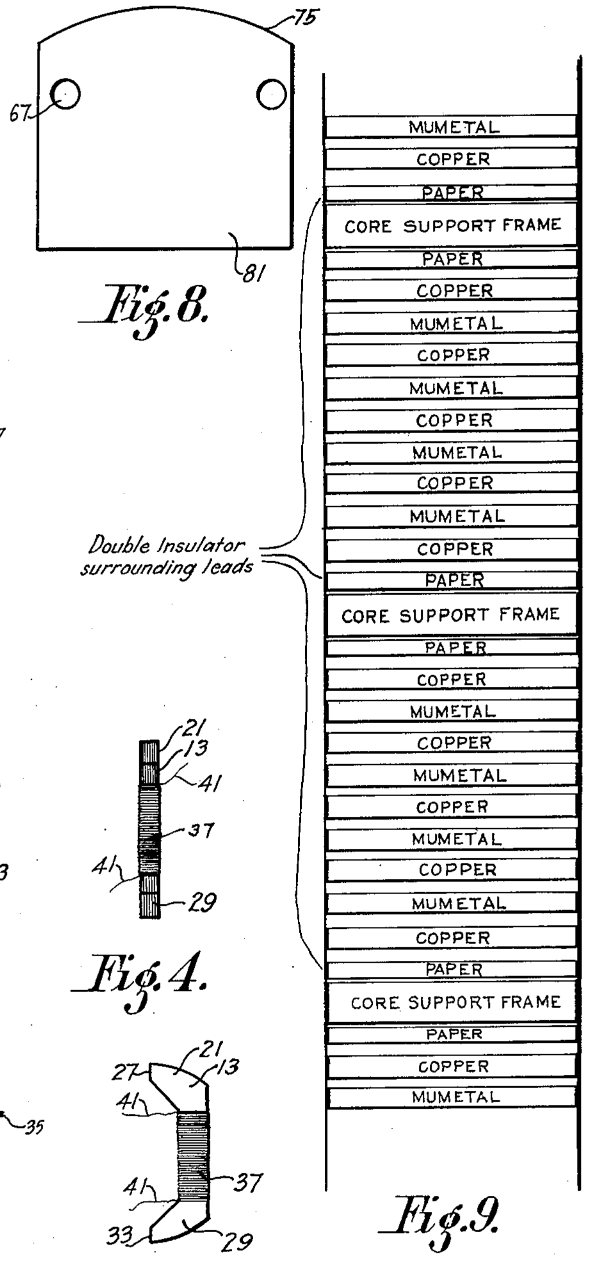
Fig. 8. Fig. 4. Fig. 9.
Fig. 3.
INVENTOR.
Walter T. Selsted
BY
Lippincott & Smith
ATTORNEYS United States Patent Office 2,769,036

Patented Oct. 30, 1956

2,769,036

MULTIPLE HEAD FOR MAGNETIC RECORDING AND REPRODUCTION

Walter T. Selsted, San Mateo, Calif., assignor to Ampex Electric Corporation, San Carlos, Calif., a corporation of California Application April 2, 1951, Serial No. 218,873

8 Claims. (Cl. 179—100.2)

This invention relates to magnetic heads for recording and playback purposes usable in connection with magnetic tape apparatus. Mechanisms of the type herein to be described utilize a flexible tape or strip upon which desired messages are recorded and from which reproduction occurs. The tape strip thickness is usually but a few thousandths of an inch. Its width is governed in accordance with the number of magnetic heads simultaneously to be used to record or reproduce messages on or from the record.

This invention deals primarily with magnetic head assemblies wherein a plurality of heads for recording or reproducing purposes may be stacked one adjacent another without fear of interaction or interference between the various components. The heads are so arranged relative to each other that adequate shielding is provided intermediate each adjacently-positioned head used in the operation.

In some uses of apparatus of this nature the number of stacked magnetic heads may vary up to as many as thirty or forty, as, for instance, recording television programs. For purposes of describing the present invention, however, it may be assumed that the assembly and apparatus herein to be described is used in connection with a multiplicity of magnetic heads of the order of seven. In installations where the humber of heads is in the range of thirty to forty, the operation is usually considered as one of such a nature that each head responds to signals in a frequency range between zero and 100 kc., so as to record television messages upon the record strip. The recording heads of the present invention will suffice for this purpose when used in multiple, although for purposes of illustrating the operation they may be any form that is desired which is suitable for recording and reproduction.

All operations of this nature are such that the tape strip upon which the message is to be recorded or from which it is to be reproduced is guided over one end of the magnetic tape head to make contact therewith over a limited arc. Usually the tape, which is preferably from paper or plastic stock, such as a cellulose or cellulose acetate preparation, having a substance such as iron-oxide coated upon one side thereof to make it adaptable for magnetic recordings, is fed from a supply reel and suitable tape tensioning mechanisms to the head. From the point or area of contact the tape is fed to a suitable take-up reel.

The magnetic heads, whether to record or reproduce, are usually formed in such a way that two core legs are constructed of any suitable magnetic material having high permeability. These core legs have their ends brought into a substantially abutting position with respect to each other. Between the two so-positioned magnetic cores there is a gap in which the spacing is precisely measured by a suitable non-magnetic shim. The cores are formed, as will later be more fully explained, as laminated components collectively forming a substantially unitary structure. The substantially abutting ends thereof at which the gap is formed, and which constitutes the area of tape contact, is usually curved or arced to permit limited arcuate contact thereon of the tape as it is drawn thereacross from one of the supply and take-up reels to the other. The gap between the abutting ends of the inwardly-turned cores is so alined with respect to the magnetic tape to be moved thereacross as to generally precisely transverse to the direction of tape motion.

In accordance with the present invention, provisions have been made whereby a multiplicity of such magnetic heads may be assembled from components which are generally identical for each head unit. Stacking of the various components relative to one another is readily provided through the use of such uniformly-spaced parts, of which all may be so-called punched parts, except for the core member itself.

The present invention is so constituted that the core members, together with their windings, are positioned in any suitable form of non-magnetic core support frame element. An element of this variety may be brass. It is formed, illustratively, by punching, and has provided therein a recess leading inwardly from an open end. The magnetic core assembly is suitably positioned and located within this recess in such fashion that at least one of the core legs is provided with fixed and stable bearing surface areas capable of locating at least two points of the magnetic core. The so-positioned core and winding are also located with respect to the extent to which the core protrudes through the open end of the frame by means of a locating and bearing surface at the inner portion of the frame recess.

Suitable means for locking the wound cores within the core support frame and holding the precise alignment therewith are also provided by virtue of the use of stamped components with which resilient elements may be used. These resilient elements maintain the cores in sufficiently precise alignment to insure satisfactory recording and reproduction operations.

In a stacked arrangement of cores and core support frames, shielding components providing electromagnetic and electrostatic shielding are arranged between each core support frame. The magnetic shielding is provided by a metal having extremely high permeability, and an example of which is the well-known mumetal, while the static shielding is provided by a material having low electrical resistance, such as copper or brass. The amount of shielding between various magnetic heads in such an assembly is somewhat of a matter of choice, with the shielding being arranged alternately for static and magnetic shielding purposes, and the total amount of shielding being measured largely by the amount of cross-talk which is tolerable between the various heads.

With the foregoing in mind, one of the objects of this invention is that of providing a magnetic head assembly in which a multiplicity of magnetic heads may be stacked relative to each other through the use of uniformly shaped parts serving to provide a laminated shielding structure adequate to insure extremely high shielding between adjacent heads.

A further object of the invention is that of providing a laminated core structure of such a nature as to permit of stacking in such a way that the core size itself is substantially the limiting factor, insofar as the overall thickness of the assembly is concerned.

A further object of the invention is that of providing a magnetic head assembly such that the core can be wound as a high impedance head and which will thus serve the use of a transformer in connection with the control circuit.

A further object of the invention is that of providing a magnetic head assembly of the multiple-head type which is of such character that the various heads can be mounted in such a way that all gaps can be set precisely in one and the same line.

Another object of the invention is to provide a readily removable and yet efficiently acting resilient core positioning arrangement for holding the core within the core support frame.

Other objects of the invention, of course, are those of providing a magnetic head assembly which is relatively simple to construct, which can be assembled rapidly and generally without the use of highly trained labor, to provide a magnetic head construction in which components are all of substantially uniform size and which can readily be assembled, and to provide a magnetic head construction in which a multiplicity of heads can readily be brought precisely into alignment to insure more accurate reproduction of messages already recorded upon the tapes, and to insure higher fidelity of recording with respect to messages to be recorded.

Other and further objects of the invention, and still further advantages thereof, will become apparent by a reading of the following description and the hereinafter-appended claims in connection with the accompanying drawings, wherein:

Fig. 2 is a plan view showing a magnetic head housing assembly with the core support frame and the wound core located therein. This view is taken with all shielding removed from the core support frame, and thus may be generally regarded as a view on the section 2—2 of Fig. 9, looking in the direction of the arrows;

Fig. 3 is a plan view of one core with a winding thereupon;

Fig. 4 is a view of the core of Fig. 3, looking from right to left to illustrate the laminations and bond between the different sections from which the core is formed;

Fig. 5 is a plan of the core support frame of Fig. 2 to illustrate the support frame separate from its core mounting and support positioning;

Fig. 6 is a plan of one of the shield elements adaptable for positioning adjacent an insulating cover over the core support frame;

Fig. 7 is a view of another form of the interhead shield elements with the open area thereof being of a size adequate to accommodate the core windings;

Figure 1:
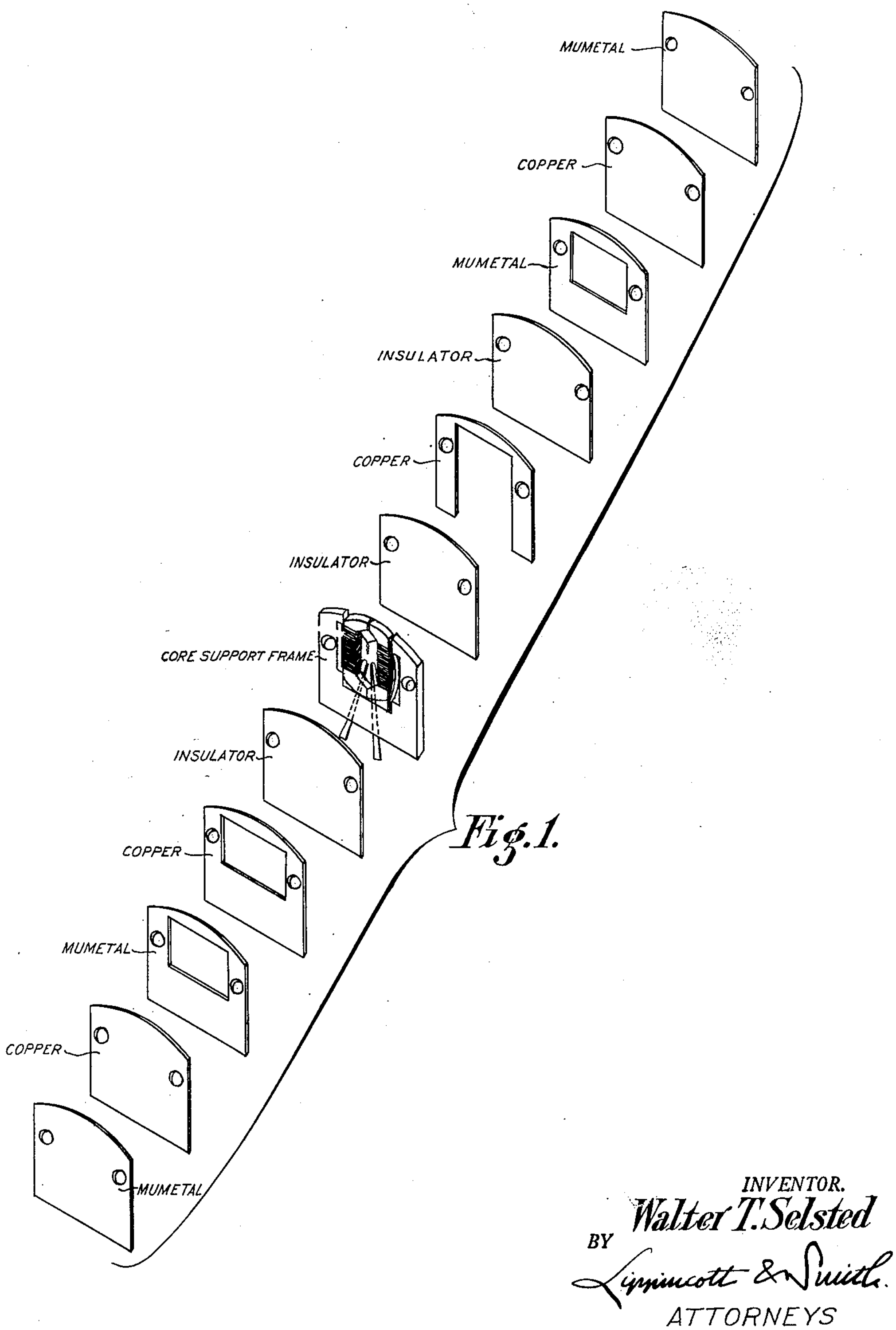
Fig. 1 is an isometric exploded view showing the assembly of one magnetic head and various shielding elements associated therewith.

Fig. 8 is a plan of a solid shield element having a periphery substantially corresponding to that of the core support frame without the open end thereof; and Fig. 9 is a schematic representation of the arrangement for stacking various shielding components relative one another for multiple head mounting and with the designations of components being solely by legend, and without reference to exact size, but showing relative relationships.

Referring now to the drawings for a further understanding of this invention, the exploded view depicted by Fig. 1 will later be referred to, in order to show the assembly of the various components forming one of the multiplicity of recording heads.

Considering first the showing of Fig. 2, a magnetic head assembly, generally designated 11, is formed from a pair of magnetic material core members 13 and 15. The cores are thus selected from material having high magnetic permeability. One such material, purely by way of illustration, is a metal known as hi Mu 80 (meaning, formed of about 80% nickel and about 20% iron with very small quantities of copper and manganese added).

In the more common form of magnetic head assemblies of this character, as shown by Fig. 4, the core consists of a plurality of layers which are bonded together in any suitable fashion, of which one is by use of a liquid and which after pressing forms a bond with the separate magnetic layers. A liquid of the form known by the trade name "Scotchweld" is suitable. In assembly the liquid is coated over each plate and serves to form the core into a laminated structure. The core members 13 and 15, in preferred shaping, have substantially straight sides and in assembly are so positioned that these sides 17 and 19, respectively, extend parallel to each other and are spaced apart from each other. The ends of these core members are turned inwardly at 21 and 23 respectively, and substantially meet except for a slight gap remaining at the space designated at 25. This slight gap is usually maintained by means of a shim 27 of the order of a few thousandths of an inch or less, with the thickness being slightly greater for the recording head than for the reproducing head. The inwardly-turned ends 29 and 31 of the opposite ends of the core members meet at the boundary 33 to form a contiguous surface, and thus join the two core arms together at one point.

The end of the substantially abutting core ends formed by the inwardly-turned end portions 21 and 23 have their outer periphery curved slightly so as to be convex relative to the parallelly extending core portions 17 and 19. In the process of manufacture the core is formed, as above noted, as a laminated element, with the number of separate sheets varying as desired. In the preferred form the core usually consists of six to eight layers and two cores with the inwardly-turned ends collectively forming a head. The thickness of each layer is generally of the order of 0.005″. After assembly, the end of the core at which the gap 25 occurs, and which gap is maintained by the shim 27, is carefully machined to a smooth outer contour of curvature. Then, in operation, a magnetic tape is drawn across the so-curved end to make contact therewith over an arc of the order of 4° either side of the norm through the center of the gap. The tape for such purposes is conventionally represented at 35 and may be assumed, by way of illustration, to move in the direction shown by the arrows.

The core is wrapped with a winding 37 with the turns arranged in each of the core members 17 and 19 being connected in series by virtue of the connection 39 established at the end of the core closest to the gap 25. The other end of the core winding 37 leads outwardly through conductors 41 from which contact is established to an external circuit. The conductors leading outwardly from the core member may be in the form of flat strips of a width of the order of the individual shielding elements, later to be described. Such a thickness may also be considered as being of the general order of the individual layers forming the laminated magnetic core. Alternatively, the conductors leading to the external circuit may be in the form of wires, preferably coated with insulation, and leading outwardly through a recess (not shown) in one leg of the core support frame 43, later to be described in detail.

The arrangement of the windings for the cores 17 and 19 is such that the core can be wound as a high impedance head which insures the saving of a transformer in the circuit setup. Further than this, with the core arrangement as shown, it is possible to wind a substantial number of turns on each core leg 17 and 19. As illustrative, but not in any sense limiting, the record head may be wound with about 150 turns of No. 43 wire per core leg, whereas the reproducing or playback head may be wound with a very considerable number of turns, generally of the order of 1,000 turns of No. 48 wire per leg. In assembly, a plurality of cores are aligned in such a way that the gaps 25 all extend in precisely the same line with the small size of the core serving to make the matter of alignment somewhat simplified.

In the event that the flat conductor strips are utilized to establish connection to the external circuit it is usually unnecessary to recess the core support frame. A core support frame 43 forms a holder for the laminated magnetic core. In one preferred form, the core support frame 43 is of generally U-shape, so that the convexly curved inwardly-turned ends 21 and 23 of the core elements protrude through an opening 45 at one of its ends when assembled therewith. The opening 45 leads into a recess 47 having a depth which is slightly less than the length of the cores 13 and 15 when considered together with their inwardly-turned ends 21 and 23, as well as 29 and 31. With this construction, at the area 33 where the inwardly-turned core ends 29 and 31 form the cores into a contiguous body, the inner part of the recess forms a bearing surface 49 whereupon the core element may be positioned.

The sidewalls of the recess 45 have at least a pair of bearing surfaces which are found at 51 and 53 at one side thereof, and at 55, 57 on the other side thereof. Bearing surfaces 51 and 53 are so located that when the core elements are supported at the bearing surface 49 at the bottom of the recess it is possible simultaneously to locate fixedly two points of the lateral edge of one of the core members. The other pair of bearing surfaces 55 and 57 are spaced from the bearing surfaces 51 and 53 by a distance slightly in excess of the width of the assembled core members.

It is desirable to provide additional recess areas, such as 59 and 61, intermediate the core support frame bearing elements 51, 53, 55, 57, in order to provide space within which the windings on the core may be located. It is possible also to utilize one of these recesses, such as that shown at 59, to house and locate a resilient core fastening spring or other resilient element 63. The spring 63 is curved and concave toward one of the core windings 17. It is sufficiently long that its outer ends 65 and 66 bear against the edges of the bearing members 55 and 57, and when in position at the opposite side also bears against the adjacently-positioned core 13.

As is apparent from the showing in Fig. 2, the spring member as it is located acts generally as a lever arm with respect to its bearing against the core member. The outer spring end of the portions 65 and 66 tends to turn about the edge of the bearing surfaces 55 and 57 nearest the recess 59 as a fulcrum to force the two cores laterally from the shown position to position the opposite core 15 in such a way as to force it tightly against the bearing surfaces 51 and 53.

The core support frame 43 is formed of any suitable non-magnetic material of which one especially suitable material is brass. It is of a thickness approximately equal to that of the laminated core, although it is to be recognized that after the windings 37 have been wrapped about the cores they extend outwardly from the plane of the support frame in directions at right angles to the plan showing of Fig. 2. As will be apparent from a consideration of Fig. 1, as well as the chart of Fig. 9, later to be discussed in more detail, a multiplicity of magnetic heads may be assembled and stacked with respect to each other, with fastening of the complete group provided by bolts or other suitable means (not shown) extending through the apertures 67.

After the core has been wound, assembled and located in the core support frame, as above described, it is usually desirable further to secure the complete assembly within the core support frame. To this end, a suitable thermoplastic filling may be inserted in the core support frame recess to surround in its entirety the supported core legs and winding. A plastic of such character is one which is generally hard at room temperatures and up to temperature ranges somewhat in excess thereof, but which at higher values of the order of 140° F. and up is in a generally fluid state. One such suitable compound is that which is known in the art as "De Kotinsky cement" which is placed into the recess in a generally fluid state so as substantially to fill the recess, but which is nonetheless slightly concave with respect thereto, so that overflow filling does not occur. Upon hardening, the plastic forms into a rigid mass by which precise location and positioning of the core legs and windings within the core support frame is insured.

Reference may now be made to Fig. 5, wherein a plan view of the core support frame is more particularly shown. The showing of Fig. 5 makes clear the fact that the structure is of such character that the complete component may readily be stamped. This is an important consideration because of the resultant simplification of manufacturing processes. Similar numerals designate similar parts in Figs. 2 and 5, so that with the detailed explanation above made further reference to Fig. 5 need not be made.

It has been pointed out in the previous description that the conductors 41 connecting the core windings 37 to an external circuit preferably pass externally of the core support frame in the form of very flat strip conductors. These conductors are electrically insulated from the core support frame in the assembly process by a suitable thin insulating sheet (such as paper) which has a central opening 69 therein (see Fig. 6) of a size sufficiently large to accommodate the windings 37 surrounding the cores 17 and 19, but which insulating layer 71 covers completely the conducting core support frame member 43. Under these circumstances, the wires or conductors 41 leading from the lower ends of the windings 37 may be passed externally of the lower flat portion of the core support frame by resting them on such an insulating surface, which surface, in turn, is placed over and adjacent the core support frame (see more particularly the diagrammatic representation of stacking order as per Fig. 9, and the schematic assembly of Fig. 1).

To accommodate the thickness of the conductor leading outwardly from the frame, a core shielding element of generally U-shaped formation, as per Fig. 7, is placed adjacent the insulating layer. This U-shaped shielding element 73 has the open end of the U faced toward the flattened base portion of the core support frame 43. The base of the generally U-shaped section is curved and of a contour substantially corresponding to that of the curved outer ends 75 of the core support frame. The thickness of the U-shaped shielding element generally corresponds to the thickness of the conductors which lead outwardly therefrom. In stacking, and in the event that the flattened conductor leading externally from the coils and windings 37 are of themselves insulated, it is desirable in assembly to place a second sheet of insulating material, such as paper, adjacent the U-shaped shielding element 73 and on the side thereof remote from the core support frame. This is not specifically indicated in Fig. 9 other than by legend, but it is to be understood as desirable. If an insulating coating is wrapped about the conductors the insulation layers become unnecessary.

Next in assembly, further shielding components of the general shape and formation like the insulator adjacent the core support frame are desirable. Certain of these insulating members may also have an open area centrally located, such as shown at 69 on Fig. 6. The shields may be of both mumetal and copper, depending upon the type of shielding to be provided, with the static shielding being provided by the copper (which has low electrical resistance) and the magnetic shielding being provided by the mumetal (which has high permeability). These shielding elements are used in a number corresponding to that number required to insure complete clearance of the insulators from the wire wrappings 37 or windings on the cores 17 and 19. To complete the shielding the outermost elements in the stacking comprise solid plate members formed of mumetal and copper, such as represented at 81 on Fig. 8. The base of these members is substantially flat, as was the base of the core support frame 43. The outer surface of each element is curved to correspond to the curvature indicated at 75 on each of Figs. 2, 6, 7 and 8 for the shielding elements. It, however, must be pointed out that the curvature is such that, despite the identity of curvature path of the shield members with the core support frame, the gap 25 of the positioned magnetic head is nonetheless so arranged as to extend to such a plane as to be capable of making contact with the magnetic tape passed thereover so that the device shall function in a manner which is well known in the recording and reproducing art.

For use with multiple recording heads, the structure hereinabove described is duplicated by a stacking process, such as that conventionally represented by the showing of Fig. 9. All parts are uniformly shaped, and, as above noted, all may be made as punchings, except for the cores. The laminated shielding structures are so arranged as to provide extremely high shielding between the various heads. The type of laminated structure permits stacking, so that the core itself constitutes the laminated element as far as thickness is concerned. In one preferred form of stacking and assuming that adequate shielding is provided, the arrangement may be as shown by Fig. 9, where the core support frames are separated by layers of shielding and insulating material comprising, in order, between any two adjacent core support frames, paper (insulator), copper, paper (insulator), mumetal, copper, mumetal, copper, mumetal, copper, mumetal, copper, paper and the next support frame. In the event that this shielding proves inadequate, one or more additional copper and mumetal shields may be included in the stack separating the heads. These various shieldings are made to depend upon the tolerable cross-talk between the various head elements. Even despite a reasonable amount of shielding, when assembled, the separation between heads is still small enough to provide adequate space for separately recording a plurality of messages on adjacent areas of a magnetic tape strip. The number of heads per inch may vary but it is to be understood that in some instances as many as fourteen to eighteen may prove feasible.

After the complete assembly has been stacked, the fastening bonds are passed through the openings 67 in all components and the various components tightened with respect to each other. The various magnetic heads are held within their respective core support frames in such a way that laterally a two-point positioning is insured, while vertically a one-point positioning is maintained. The resilient spring elements each serve to support the opposite core leg and maintain both core legs pressed tightly against the lateral alignment bearings. Upon completion of the assembly, and with the cores securely supported within the core support frames, and immediately prior to the tightening the complete group of components with respect to one another, the assembly is preferably examined under a microscopic observation in order to insure that all gaps between the core members are precisely aligned. Where the alignment is not precise, the core support frame assemblies are slightly shifted in position until a precise alignment is achieved, whereupon the components are tightened and secured with respect to one another. The separation of the gaps between the substantially-abutting inwardly-curved core ends 21 and 23 may be of the order well known in the art relating to magnetic recording and reproducing operations, but illustratively, for purposes of recording, the gap may be of the order of 0.002″, while for playback or reproduce the gap is much smaller and, illustratively, of the order of about 0.00025″.

In the light of the foregoing description, it will be apparent that a magnetic head assembly is formed from the magnetic core held within its core support frame. This support frame is then shielded by various shielding components which are stacked on either side thereof. The exploded isometric showing in Fig. 1 is to depict this general relationship and may be considered jointly with Fig. 9. It will be appreciated that, while the showing is not to scale, it is nonetheless of such a character as to represent generally one suitable order for assembling the various components one with respect to the other. After the components have been so arranged they are pressed tightly against each other and tightly with respect to the corresponding components of the next adjacent head assembly and aligned as already mentioned herein.

It will be apparent from what has been stated above that various modifications may be made in the structure hereinabove described. It is, therefore, to be understood that the foregoing description outlines one preferred form of assembly with components selected to achieve the desired result. However, it will be appreciated that equivalent results may be had with modifications, so long as the broad principles hereinabove outlined for assembly are retained.

Having now described the invention, what is claimed is:

1. A magnetic assembly unit for the recording and reproduction of signals on a magnetic tape, comprising a magnetic core having two substantially parallel magnetic legs, each leg having inwardly turned portions at its ends, one of the inwardly turned portions of each leg being in physical contact with the corresponding portion of the other leg, the extremities of the other two inwardly turned portions being in close proximity to provide a magnetic gap, windings on said parallel legs, a substantially U-shaped core supporting frame, said frame having a thickness corresponding substantially to the thickness of the core, said frame being disposed to embrace the core with the magnetic gap disposed beyond the open side of the frame, spaced shoulders formed on the inner edge of one branch of the frame forming locating surfaces contacting the adjacent core leg at regions near the ends of said leg, the medial portion of the frame which connects the two branches having its inner edge contacting the extremities of the adjacent inwardly turned portions, and means interposed between the other core leg and the branch of the frame for urging other said core legs together and toward said shoulder to maintain a fixed position for the magnetic gap relative to the frame.

2. An assembly unit as in claim 1 together with insulating sheets extending over the side faces of the unit.

3. A magnetic unit as in claim 1 together with sheets of insulation extending over both sides of the assembly, and electromagnetic and electrostatic shielding elements likewise extending across the sides of the unit.

4. A magnetic head assembly comprising a plurality of units as defined in claim 1 included in a single head, together with insulating, electrostatic and electromagnetic shield members extending between said assemblies, said units together with said members being clamped together to form one assembly head.

5. A magnetic head assembly as in claim 1 in which said last means comprises a spring strip which is normally stressed to urge said core legs together.

6. A magnetic head comprising a plurality of magnetic assembly units, each unit comprising a magnetic core having two substantially parallel magnetic legs, each leg having inwardly turned portions at its ends, one of the inwardly turned portions of each leg being in physical contact and the extremities of the other two inwardly turned portions being in close proximity to provide a magnetic gap, a substantially U-shaped core supporting frame included in each unit, said frame embracing the core with said proximate core leg portions disposed beyond the open end of the frame, means for retaining the cores in fixed positions relative to the frames and to urge the legs of the cores together, electromagnetic and electrostatic shield members interposed between said units, means for clamping the assembly units together upon the intervening shielding members, corresponding edges of the proximate core portions and said shield members being formed to present a continuous arcuate surface for contacting a magnetic tape whereby said tape can be moved in recording or reproducing relation to said units simultaneously.

7. A magnetic head comprising a plurality of magnetic assembly units, each unit comprising a magnetic core having two substantially parallel magnetic legs, each leg having inwardly turned portions at its ends, one of the inwardly turned portions of each leg being in physical contact with each other and the extremities of the other two inwardly turned portions being in proximate spaced relationship to provide a magnetic gap, a non-magnetic shim disposed in said gap, a substantially U-shaped core supporting frame included in each unit, said frame embracing the core with said proximate core leg portions disposed beyond the open end of the frame, means for retaining the cores of each unit in fixed positions relative to the associated frame and to urge the legs of the cores together, flat shielding sheets of magnetic and non-magnetic conducting material interposed between said units, said sheets being dimensioned so that their outer edges coincide with the outer edges of the U-shaped core supporting frame, and means for clamping the assembly units together upon the intervening sheets whereby said sheets and said units form a continuous arcuate surface for contacting a magnetic tape whereby said tape can be moved in recording and reproducing relationship to a plurality of said units simultaneously.

8. A magnetic head assembly as in claim 7 together with insulating sheets interposed between said units.

References Cited in the file of this patent

UNITED STATES PATENTS

| | | |
|---|---|---|
| 2,513,617 | Begun | July 4, 1950 |
| 2,513,653 | Kornei | July 4, 1950 |
| 2,523,576 | Kornei | Sept. 26, 1950 |
| 2,538,892 | Begun | Jan. 23, 1951 |
| 2,549,771 | Camras | Apr. 24, 1951 |
| 2,592,652 | Berhundorf | Apr. 15, 1952 |
| 2,618,709 | Eckert | Nov. 18, 1952 |
| 2,658,113 | Holmes | Nov. 3, 1953 |